Figure 1:
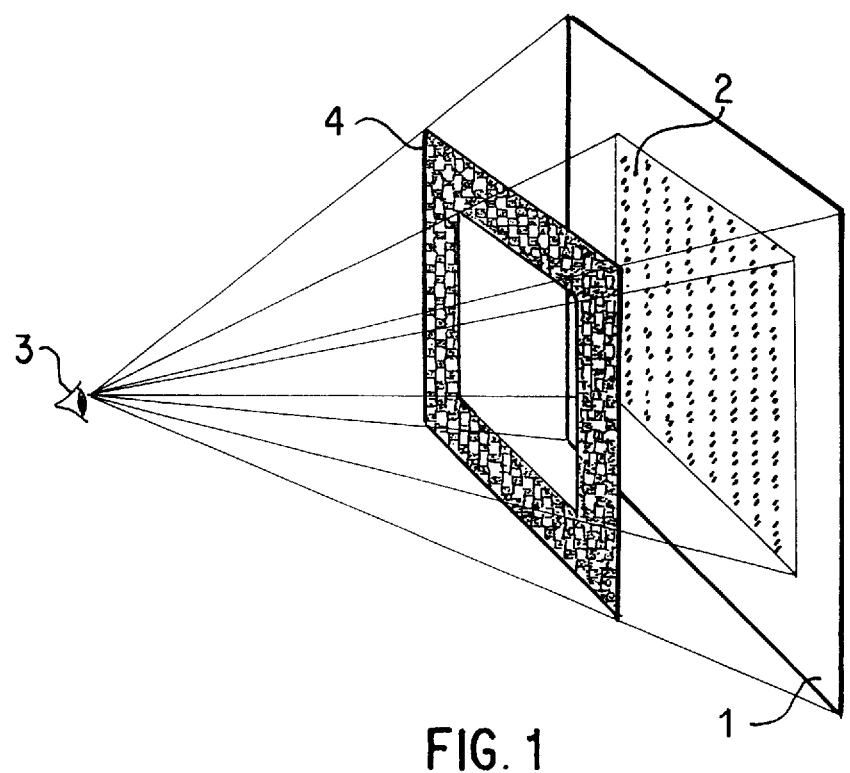

United States Patent

Shanks et al.

[11] Patent Number: 5,806,218
[45] Date of Patent: Sep. 15, 1998

[54] BORDER FOR AN IMAGE

[75] Inventors: Ian Alexander Shanks, Bedford, England; Christoph Dobrusskin, Eindhoven, Netherlands

[73] Assignee: Central Research Laboratories Limited, Middlesex, England

[21] Appl. No.: 716,395
[22] PCT Filed: Mar. 27, 1995
[86] PCT No.: PCT/GB95/00683
  § 371 Date: Nov. 14, 1996
  § 102(e) Date: Nov. 14, 1996
[87] PCT Pub. No.: WO95/27228
  PCT Pub. Date: Oct. 12, 1995

[30] Foreign Application Priority Data

Mar. 31, 1994 [GB] United Kingdom ............... 9406481

[51] Int. Cl.$^6$ ..................................... G02B 7/22
[52] U.S. Cl. ........................... 40/427; 40/442; 40/768
[58] Field of Search .............................. 40/768, 560, 579, 40/427, 442; 348/44; 359/463, 478

[56] References Cited

U.S. PATENT DOCUMENTS 3,583,961  6/1971  Shindo ................................. 348/44
3,701,581  10/1972  Henkes .............................. 359/478

FOREIGN PATENT DOCUMENTS 1377294  9/1964  France ................................. 359/619
  932039  7/1955  Germany ........................... 359/619
9313699  7/1993  WIPO ................................. 359/619

Primary Examiner—Cassandra H. Davis
Attorney, Agent, or Firm—Evenson, McKeown, Edwards & Lenahan, P.L.L.C.

[57] ABSTRACT

A border for a substantially two-dimensional image comprises an anterior pattern and a posterior pattern, the patterns being space one from the other and being arranged to form, when viewed together, a resultant apparent pattern in a different plane to that of the image. The patterns each comprise relatively brighter and relatively darker regions, but each usually has a different pitch. The posterior pattern may advantageously comprise an array of reflective dots printed onto a major surface of a light transmissive sheet which may be edge lit by a light source. The border brightness can then be independent of ambient light conditions and simple to manufacture.

4 Claims, 2 Drawing Sheets

BORDER FOR AN IMAGE

This invention relates to a border for a substantially planar image, the border carrying a first pattern and a second pattern superimposed on, but spaced from the first pattern in a direction substantially orthogonal to the plane of the image, the patterns being made up from visually contrasting regions, overlying parts of the first and second patterns being such as to form a resultant pattern appearing to lie in front of and/or behind the plane of the image, the first pattern comprising relatively bright and relatively darker regions.

A known border of this general kind is disclosed in U.S. Pat. No. 3,582,961. In this known border the first and second patterns are formed by visually contrasting regions in the form of stripes. When viewed together these patterns form a resultant stripe pattern which appears to lie out of the plane of the two patterns. The result is that, if the image is two dimensional, for example a pictorial or graphics image displayed on the display screen of a cathode ray tube, flatness cues in the image are suppressed as far as an observed is concerned; an illusion of depth in the image is created, which derives from monocular depth cues e.g. perspective, motion parallax etc.) in the image.

This known border has certain disadvantages, however. The strip patterns only give parallax when the viewer moves his head in one direction, for example from left to right. Also, the resultant pattern is not very bright. If a light source is positioned behind the patterns to improve the brightness of the resultant pattern, the border becomes bulky and difficult to position and handle.

A second known border is disclosed in WO 93/13699. This border comprises a pair of microlens arrays which produce a "bubble-like" pattern.

According to the invention, a border of the kind defined in the first paragraph above is characterized in that the said relatively bright regions consist of light sources or regions which scatter or reflect incident light, and the second pattern comprises regions which are relatively more and relatively less light transmissive thereby forming a masking pattern. Using this arrangement the border brightness can be made less dependent on ambient light conditions.

The resultant pattern and the image preferably exhibit parallax in a plurality of directions. This arrangement can make the illusion of a border in a different plane to that of the image more complete.

The first or second pattern is preferably carried on a major surface of a light transmissive sheet, and the sheet is provided with means for inputting light through an edge thereof. The first pattern may advantageously comprise an array of regions which scatter or reflect incident light, which regions are carried on a major surface of a light transmissive sheet. The light transmissive sheet may be provided with a light source being positioned for inputting light to the sheet through an edge thereof. Such an arrangement can be much thinner and more compact than a back lit arrangement.

Figure 2:
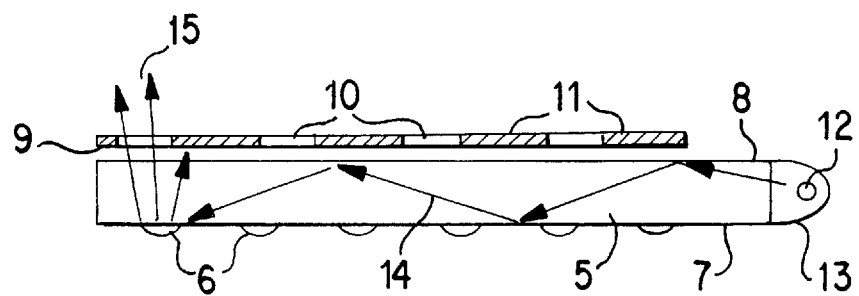
Figure 3:
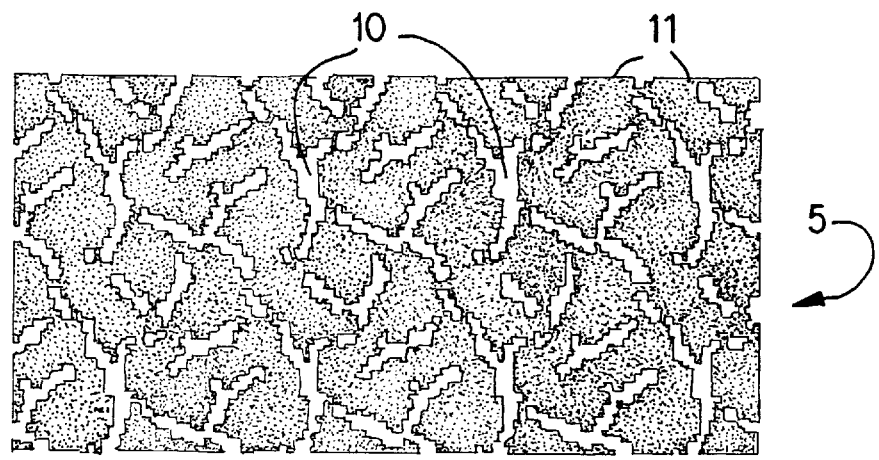
Figure 4:
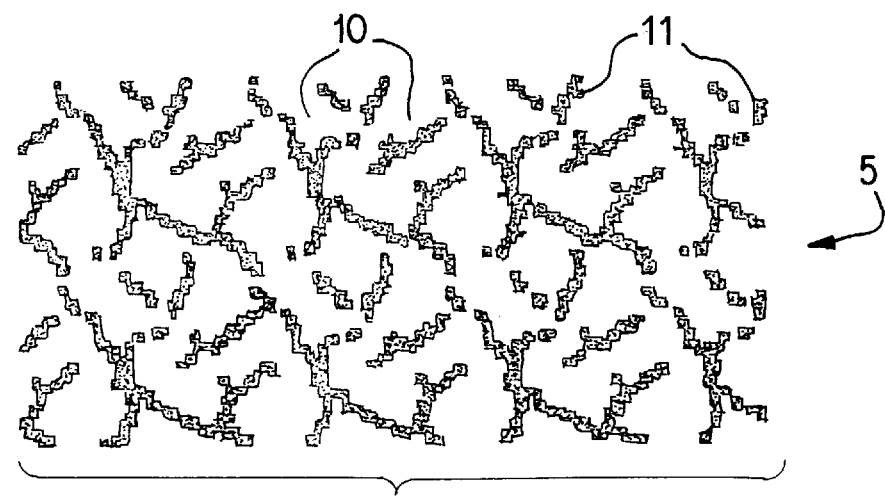

Embodiments of the invention will be described, by way of example, with reference to the accompanying diagrammatic drawings in which FIG. 1 illustrates the formation of a resultant pattern by means of an embodiment of the invention, FIG. 2 shows a cross-section through a possible construction for part of the embodiment of FIG. 1, FIG. 3 shows a possible configuration for part of the embodiment of FIGS. 1 and 2, and FIG. 4 shows a possible alternative to the configuration of FIG. 3.

FIG. 1 illustrates in perspective view the general effect of a border in accordance with the invention. In this Figure the border 1 surrounds and is substantially coplanar with a substantially planar two-dimensional image 2, for example an image displayed on the display screen of a cathode ray tube (not shown). However, an observer 3 observes a virtual border 4 which lies out of the plane of the border 1 and the image 2, and the psychological effect of this is that flatness cues in the image 2 are suppressed; the apparent depth of the image 2 is enhanced. The virtual border 4 may lie in front of the actual border 1 as shown and/or behind it, depending on the construction of the actual border 1.

FIG. 2 shows a cross-section through part of a possible construction for the border 1 of FIG. 1. In FIG. 2 each of the four sides of the border 1, only one of which is shown, comprises a sheet 5 of transparent material having a two-dimensional array or pattern of dots 6 of white paint provided on one major surface 7. Positioned against the other major surface 8 of the sheet 5, and in practice separated slightly therefrom by spacer particles (not shown), is a foil 9 which carries a pattern of clear areas 10 in a dark background 11. The sheet 5 is edge-lit by means of an elongate lamp 12 provided with a concave reflector 13. Light from the lamp 12, which is denoted by arrows 14, is totally internally reflected at the surfaces 7 and 8 except where it encounters an area of the surface 7 on which a dot 6 is provided. At these areas the light is scattered and a substantial proportion of the scattered light emerges through the surface 8, as indicated, for example, by the arrows 15. Light which emerges through an area of the surface 8 which is overlaid with a clear area 10 of the foil 9 travels on and can be observed by the observer 3 of FIG. 1.

The light source may if desired be arranged to illuminate the surface of elongate strip of fluorescent plastic, one of whose edges is optically coupled to or adjacent an edge of the transparent plastic sheet.

Overlying portions of the patterns formed by the dots 6 and the clear portions 10 respectively have different pitches and a resultant pattern appears to an observer viewing the light emerging through the clear portions 10 to lie on that side of the assembly 5, 9 which carries the pattern of smaller pitch.

In one assembly 5, 9 constructed as shown in FIG. 2 the sheet 5 was of transparent plastics material having a physical thickness of 4 mm and an optical thickness of 2.6 mm. The dots 6 were 0.42 mm in diameter and were positioned in a square array at a constant pitch of 1.7 mm. The clear areas 10 were also positioned in a square array at a constant pitch of 1.69 mm. The two arrays were aligned with each other, i.e. were not relatively skewed. The resultant pattern appeared to an observer to lie at a distance 433 mm in front of the foil 9 (given by the (approximate) formula $$B/[(D/C)-1]$$

where B is the optical thickness of sheet 5, C is the pitch of the array of clear portions 10, and D is the pitch of the array of dots 6).

The clear areas 10 of FIG. 2 may have any shape (as may the dots 6). If the dots 6 are small and substantially circular the brighter components of the resultant pattern will have a shape corresponding to the shape of the clear areas 10 (which are substantially identical to each other) and, conversely, the darker components of the resultant pattern will have a shape corresponding to the shape of the components of the dark areas 11. FIGS. 3 and 4 show (greatly enlarged) two examples in plan view of possible configurations of the light and dark areas 10 and 11, the configuration of FIG. 4 being the negative of the configuration of FIG. 3.

The resultant pattern has in general much coarser detail than the finer detail in the first and second patterns. It is advantageous to use as fine a lattice spacing for the first and second pattern as possible to reduce the resultant granularity. Printing of 1200 or 2400 dpi resolution (but with each element of the patterns comprising many such dots) is preferable.

Although as described the patterns formed by the clear areas 10 and the dots 6 are each square arrays, this is not essential. However, whatever shape of array is employed for say, a given area of the pattern formed by the dots 6, the same shape of array should be employed for the overlying area of the pattern formed by the clear areas 10 and should not be skewed relative to the underlying array.

It will be evident that many modifications are possible to the embodiment described within the scope of the invention as defined by the claims.

As a first example the actual patterns formed by the paint areas 6 and the clear areas 10 may be transposed, in which case the brighter components of the resultant pattern (which, if the pitches of the two patterns remain unchanged will now appear to an observer to lie beneath the surface 7 of the plate 5) will have a shape corresponding to the shape of the areas of paint 6. The total area of the scattering sites should be less than about 50% to ensure light from an edge is not largely attenuated.

As a second example the dots of paint 6 may be replaced by indentations at corresponding positions in the surface 7, which indentations may have optically smooth or rough surfaces so that they act as ray direction-changing or scattering centers similar to the dots 6. Such indentations may be filled with material which reflects or scatters light if desired. Indentations in the shape of cones are particularly advantageous, but most concave shapes will work adequately.

As a third example the four sides of the border 1 of FIG. 1 may be formed using a single sheet of transparent material which extends in addition over the area of the image 2, the patterns 6 and 10, 11 being provided only at areas of the sheet where the border 1 is required.

It is not even necessary to use an edge-lit transparent sheet. An alternative is to use two foils similar to the foil 9 of FIG. 2 positioned one on each side of a transparent sheet, the two foils carrying patterns of clear areas corresponding to the patterns formed by the areas 10 and the dots 6 respectively and the resulting composite sheet being illuminated from the opposite side to that on which the observer is present. As an alternative the foil situated on the opposite side of the plate to that on which the observer is present may be replaced by an array of light sources, for example phosphor dots or light-emitting diodes, positioned to create a pattern corresponding to that which would have been created by the foil which has been replaced. Such light sources should preferably supply non-collimated light, otherwise the resultant pattern will not be viewable over a wide area or angle.

Although as described the pitches of the patterns formed by the dots 6 and the clear areas 10 are constant over the whole area of the border, this is not essential. The pitch of the clear areas 10 may, for example, steadily increase on going from top to bottom of each side of the border 1 of FIG. 1 and/or the pitch of the dots 6 may steadily decrease on going from top to bottom, and this in such a way that the pitch of the clear areas 10 is greater than the pitch of the dots 6 at the top of the border whereas the reverse is the case at the bottom of the border. The resultant pattern will then appear to an observer to be tilted out of the plane of the image 2 so that it appears to lie in front of this plane at the top of the image and behind this plane at the bottom of the image.

Although as described the two patterns which give rise to the resultant pattern are each made up from relatively bright and relatively dark areas they may alternatively be made up from areas which optically contrast in another way, for example in respect of colour. Furthermore, more than two types of area, e.g. more than two shades of brightness or more than two colours, may make up one or both patterns.

The border may comprise a transparent sheet having a pattern carried on opposing major surfaces, but this will only work well for backlit borders as the pattern on the front surface may absorb light which would normally be internally reflected.

Although the examples described above employ regular arrays of dots or transparent areas of a mask, the patterns need not be regular, as long as the patterns may be combined together to create a resultant pattern which appears to lie in front of and/or behind the plane of the image. This requires the presence of short-range order, which correlates to some degree in overlying areas of the two patterns.

In practice any repeating pattern may be used in this manner together with an array of dots or point light sources. Two more complicated superimposed patterns may be employed as an alternative, but the example in which one pattern is an array of points is simpler to understand.

If the first and/or second patterns are provided on one or more light transmissive sheets, it is advantageous to ensure that the light transmissive sheet is not present over the area of the image, as this may degrade the image contrast and result in extra reflections which can act as flatness cues.

The border need not be closed and need not completely surround the image in order for the border to suppress psychological flatness clues. In practice approximately 10% of the circumference of the image should be provided with such a border to give the illusion of apparent depth, but the exact value will depend on the individual viewer and the strength of other flatness cues present. For example, only having such a border at the corners or at the sides of a rectangular image can create the illusion of depth. Such a partial border may also be used with patterns formed from microlens arrays or integral photographs to give the same effect of enhanced depth perception. It is advantageous for such partial borders to have portions at more than one side of the image, preferably positioned symmetrically around the image.

The first and second patterns need not themselves be planar or parallel to one another. It is also not necessary for the resultant pattern to appear to be planar. It is however advantageous if the resultant pattern moves when the observer moves his head with realistic "parallax"—i.e. that the pattern moves to the left and right or right and left as the observer's head moves to the left and right respectively. It is particularly advantageous if as in the present example, the resultant pattern moves relative to the given image to provide a motion parallax in two dimensions when the position of the viewpoint changes—for example for vertical and horizontal components of viewer head movement. The motion may be of the viewer or of the image and border. The pattern regions are not skewed relative to one another.

It is advantageous to have the resultant pattern appear in front of the image as this gives an enhanced sense of depth.

The density of the more and less light transmissive regions in the patterns need not have a constant density or contrast across the full width of the border. The brighter and/or darker regions in the first and/or second pattern need not all be equally light or equally dark—several levels of brightness may be present simultaneously in different regions of the patterns.

Borders may be employed in which apparent resultant patterns in more than one plane co-exist to give an enhanced perception of depth (for example one in front of the plane of the image to be bordered and one behind the plane of the image to be bordered).

The image may be provided with the border by mounting the image (for example a photograph, or a projected picture) on the front of a border as described above which extends laterally beyond the edges of the image.

Although in the above examples a substantially planar image has been used for illustrative purposes, it is to be understood that the image need not be wholly planar. Images formed on a slightly curved television screen, or works with limited depth information present such as a bas-relief may also have their apparent depth increased by using a border according to the present invention.

Patterns with different pitches have been described above. The same effect may be achieved using identical pitches, as the pitches will appear to be different to an observer by virtue of the different angle that each will subtend from the observers position in space.

The image may be formed upon a display means such as for example a cathode ray tube or a liquid crystal display or a projector screen.

In summary, a border for a substantially two dimensional image comprises an anterior pattern (10, 11) and a posterior pattern (6), the patterns being spaced one from the other and being arranged to form, when viewed together, a resultant apparent pattern in a different plane to that of the image. The patterns each comprise relatively brighter (6, 10) and relatively darker (11) regions, but each usually has a different pitch. The posterior pattern may advantageously comprise an array of reflective dots (6) printed onto a major surface (7) of a light transmissive sheet (5) which may be edge lit by a light source (12). The border brightness can then be independent of ambient light conditions and simple to manufacture.

We claim:

1. A border for a substantially planar image, comprising:

a transparent sheet;

a first pattern comprising relatively bright and relatively darker regions formed by scattering centers distributed over at least part of one major surface of said transparent sheet;

a second pattern comprising regions which are relatively more and relatively less light transmissive thereby forming a masking pattern, said second pattern being superimposed on, but spaced from said first pattern in a direction substantially orthogonal to a plane formed by said first pattern, and being provided on or adjacent another major surface of said transparent sheet;

wherein overlying parts of said first and second patterns are such as to form a resultant pattern appearing to lie outside of the plane of said transparent sheet; and a light source for illuminating said scattering centers with light provided through an edge of said transparent sheet and travelling along an interior of said transparent sheet.

2. A border according to claim 1, wherein said resultant pattern is capable of exhibiting parallax in a plurality of directions when used with the image.

3. A border according to claim 1, wherein said scattering centers are formed by areas of paint or ink provided on the one major surface.

4. A border according to claim 3, wherein said transparent sheet includes an aperture.

* * * * *